(12) United States Patent
Wang et al.

(10) Patent No.: US 10,746,157 B2
(45) Date of Patent: Aug. 18, 2020

(54) NOISE REDUCER FOR A WIND TURBINE ROTOR BLADE HAVING A CAMBERED SERRATION

(71) Applicant: General Electric Company, Schenectady, NY (US)

(72) Inventors: Guannan Wang, Neufahrn (DE); Benoit Philippe Petitjean, Moosburg (DE); Andreas Herrig, Garching b. Muenchen (DE); Roger Drobietz, Rheine (DE)

(73) Assignee: General Electric Company, Schenectady, NY (US)

( * ) Notice: Subject to any disclaimer, the term of this patent is extended or adjusted under 35 U.S.C. 154(b) by 70 days.

(21) Appl. No.: 16/118,533

(22) Filed: Aug. 31, 2018

(65) Prior Publication Data

US 2020/0072185 A1 Mar. 5, 2020

(51) Int. Cl.
*F04D 29/66* (2006.01)
*F03D 1/06* (2006.01)

(52) U.S. Cl.
CPC ......... *F03D 1/0633* (2013.01); *F03D 1/0641* (2013.01); *F03D 1/0675* (2013.01);
(Continued)

(58) Field of Classification Search
CPC .... F03D 1/0641; F03D 1/0675; F03D 1/0683; F05D 2240/304; F05D 2250/232; F05D 2260/96; F04D 29/388; F04D 29/667
(Continued)

(56) References Cited

U.S. PATENT DOCUMENTS

| | | |
|---|---|---|
| 175,355 A | 3/1876 | King |
| 573,562 A | 12/1896 | Wittram |
| (Continued) | | |

FOREIGN PATENT DOCUMENTS

| | | |
|---|---|---|
| CN | 106168193 A | 11/2016 |
| DE | 4440744 A1 | 5/1996 |
| (Continued) | | |

OTHER PUBLICATIONS

Co-Pending U.S. Appl. No. 15/952,498, filed Apr. 13, 2018.
(Continued)

*Primary Examiner* — Kenneth J Hansen
*Assistant Examiner* — Andrew J Marien
(74) *Attorney, Agent, or Firm* — Dority & Manning, P.A.

(57) ABSTRACT

A rotor blade assembly for a wind turbine includes a rotor blade having surfaces defining a pressure side, a suction side, a leading edge, and a trailing edge extending between a blade tip and a blade root. The rotor blade assembly also includes at least one noise reducer adjacent to the trailing edge. The noise reducer(s) includes at least one serration extending beyond the trailing edge in a chord-wise direction of the rotor blade. The serration(s) also includes a suction side surface and a pressure side surface. The suction side surface defines a first radius of curvature in the chord-wise direction and the pressure side surface defines a second radius of curvature in the chord-wise direction. Further, the first radius of curvature may be larger than the second radius of curvature such that the suction side surface is flatter than the pressure side surface or vice versa.

16 Claims, 7 Drawing Sheets

(52) U.S. Cl.
CPC ......... *F03D 1/0683* (2013.01); *F04D 29/667* (2013.01); *F05B 2220/30* (2013.01); *F05B 2240/221* (2013.01); *F05B 2240/30* (2013.01); *F05B 2250/183* (2013.01); *F05B 2250/232* (2013.01); *F05B 2260/96* (2013.01); *F05D 2240/304* (2013.01); *F05D 2250/232* (2013.01); *F05D 2260/96* (2013.01)

(58) Field of Classification Search
USPC ........................................................ 416/228
See application file for complete search history.

(56) References Cited

U.S. PATENT DOCUMENTS

| | | | |
|---|---|---|---|
| 1,861,065 A | 5/1932 | Poot | |
| RE19,412 E | 1/1935 | Zaparka | |
| 2,071,012 A | 2/1937 | Adams | |
| 2,225,312 A | 12/1940 | Mason | |
| 2,238,749 A | 4/1941 | Peltier | |
| D131,271 S | 2/1942 | Collura | |
| 2,312,219 A | 4/1943 | Sensenich | |
| 2,469,167 A | 5/1949 | Little | |
| 2,899,128 A | 8/1959 | Vaghi | |
| 4,089,618 A | 5/1978 | Patel | |
| 4,146,967 A | 4/1979 | Rohner et al. | |
| 4,204,629 A | 5/1980 | Bridges | |
| 4,618,313 A * | 10/1986 | Mosiewicz | B64C 11/18 416/23 |
| 4,720,244 A | 1/1988 | Kluppel et al. | |
| 4,962,826 A | 10/1990 | House | |
| 5,088,665 A * | 2/1992 | Vijgen | B64C 23/06 244/198 |
| 5,273,400 A * | 12/1993 | Amr | F04D 29/545 416/169 A |
| 5,320,491 A | 6/1994 | Coleman et al. | |
| 5,328,329 A | 7/1994 | Monroe | |
| 5,522,266 A | 6/1996 | Nicholson et al. | |
| 5,533,865 A | 7/1996 | Dassen et al. | |
| 5,819,357 A | 10/1998 | Gould | |
| 6,023,898 A | 2/2000 | Josey | |
| 6,352,601 B1 | 3/2002 | Ray | |
| 6,491,260 B2 | 12/2002 | Borchers et al. | |
| 6,729,846 B1 | 5/2004 | Wobben | |
| 6,733,240 B2 | 5/2004 | Gilebe | |
| 6,779,978 B2 | 8/2004 | Camargo Do Amarante | |
| 6,789,769 B2 | 9/2004 | Mau et al. | |
| 6,830,436 B2 | 12/2004 | Shibata et al. | |
| 7,059,833 B2 | 6/2006 | Stiesdal et al. | |
| 7,198,471 B2 | 4/2007 | Gunneskov et al. | |
| 7,328,770 B2 | 2/2008 | Owens et al. | |
| 7,351,041 B2 | 4/2008 | Uselton et al. | |
| 7,413,408 B1 | 8/2008 | Tafoya | |
| 7,458,777 B2 | 12/2008 | Herr | |
| 7,600,963 B2 | 10/2009 | Miller | |
| 7,632,068 B2 | 12/2009 | Bak et al. | |
| 7,637,721 B2 | 12/2009 | Driver et al. | |
| 7,740,206 B2 | 6/2010 | Eaton et al. | |
| 7,811,063 B2 | 10/2010 | Bonnet | |
| 7,901,189 B2 | 3/2011 | Gupta et al. | |
| 7,909,576 B1 | 3/2011 | van der Bos et al. | |
| 7,918,653 B2 | 4/2011 | Standish et al. | |
| 7,959,412 B2 | 6/2011 | Bonnet | |
| 7,976,276 B2 | 7/2011 | Riddell et al. | |
| 7,976,283 B2 | 7/2011 | Huck | |
| 8,038,407 B2 | 10/2011 | Rao | |
| 8,083,488 B2 | 12/2011 | Fritz | |
| 8,157,532 B2 | 4/2012 | Matesanz Gil et al. | |
| 8,267,657 B2 | 9/2012 | Huck et al. | |
| 8,317,479 B2 | 11/2012 | Vronsky et al. | |
| 8,414,261 B2 * | 4/2013 | Bonnet | F03D 1/0641 415/119 |
| 8,430,638 B2 | 4/2013 | Drobietz et al. | |
| 8,506,250 B2 | 8/2013 | Bagepalli et al. | |
| 8,517,682 B2 | 8/2013 | Hancock | |
| 8,523,515 B2 | 9/2013 | Drobietz et al. | |
| 8,834,127 B2 | 9/2014 | Giguere et al. | |
| 8,944,776 B2 | 2/2015 | Lenz et al. | |
| 9,239,039 B2 | 1/2016 | Herr et al. | |
| 9,341,158 B2 | 5/2016 | Smith et al. | |
| 9,494,134 B2 | 11/2016 | Kinzie | |
| 9,617,974 B2 | 4/2017 | Singh | |
| 9,638,164 B2 * | 5/2017 | Vedula | F03D 1/0675 |
| 9,670,901 B2 | 6/2017 | Orbrecht et al. | |
| 9,841,002 B2 | 12/2017 | Oerlemans | |
| 10,012,207 B2 | 7/2018 | Oerlemans et al. | |
| 2001/0008032 A1 | 7/2001 | Llewellyn-Jones et al. | |
| 2003/0175121 A1 | 9/2003 | Shibata et al. | |
| 2004/0219059 A1 | 11/2004 | Barringer et al. | |
| 2004/0253114 A1 | 12/2004 | Gunneskov et al. | |
| 2006/0175465 A1 | 8/2006 | Teichert | |
| 2007/0025858 A1 | 2/2007 | Driver et al. | |
| 2007/0041823 A1 | 2/2007 | Miller | |
| 2007/0056801 A1 | 3/2007 | Iversen | |
| 2007/0065290 A1 | 3/2007 | Herr | |
| 2007/0077150 A1 | 4/2007 | Llorente Gonzalez | |
| 2007/0125919 A1 | 6/2007 | Hopkins | |
| 2007/0294848 A1 | 12/2007 | Dumler | |
| 2008/0001363 A1 | 1/2008 | Bhate | |
| 2008/0061192 A1 | 3/2008 | Sullivan | |
| 2008/0080977 A1 | 4/2008 | Bonnet | |
| 2008/0107540 A1 | 5/2008 | Bonnet | |
| 2008/0166241 A1 | 7/2008 | Herr et al. | |
| 2008/0187442 A1 | 8/2008 | Standish et al. | |
| 2008/0298967 A1 | 12/2008 | Matesanz Gil et al. | |
| 2009/0016891 A1 | 1/2009 | Parsania et al. | |
| 2009/0050154 A1 | 2/2009 | Strothmann et al. | |
| 2009/0074585 A1 | 3/2009 | Koegler et al. | |
| 2009/0087314 A1 | 4/2009 | Haag | |
| 2009/0097976 A1 | 4/2009 | Driver et al. | |
| 2009/0104038 A1 | 4/2009 | Grabau | |
| 2009/0104436 A1 | 4/2009 | Herr et al. | |
| 2009/0126131 A1 | 5/2009 | Delaere et al. | |
| 2009/0169393 A1 | 7/2009 | Bagepalli et al. | |
| 2009/0274559 A1 | 11/2009 | Petsche et al. | |
| 2010/0028161 A1 | 2/2010 | Vronsky et al. | |
| 2010/0068042 A1 | 3/2010 | Bruck et al. | |
| 2010/0101037 A1 | 4/2010 | Gross et al. | |
| 2010/0104436 A1 | 4/2010 | Herr et al. | |
| 2010/0127504 A1 | 5/2010 | Hancock | |
| 2010/0143151 A1 | 6/2010 | Kinzie et al. | |
| 2010/0266382 A1 | 10/2010 | Campe et al. | |
| 2010/0329879 A1 | 12/2010 | Presz, Jr. et al. | |
| 2011/0018282 A1 | 1/2011 | Hayashi et al. | |
| 2011/0042524 A1 | 2/2011 | Hemmelgarn et al. | |
| 2011/0142637 A1 | 6/2011 | Riddell et al. | |
| 2011/0142665 A1 * | 6/2011 | Huck | F03D 1/0633 416/228 |
| 2011/0223030 A1 | 9/2011 | Huck et al. | |
| 2011/0268558 A1 | 11/2011 | Driver et al. | |
| 2012/0027590 A1 | 2/2012 | Bonnet | |
| 2012/0070281 A1 | 3/2012 | Fuglsang et al. | |
| 2012/0141269 A1 | 6/2012 | Giguere et al. | |
| 2013/0136601 A1 * | 5/2013 | Watral | F03D 1/025 416/128 |
| 2013/0164141 A1 | 6/2013 | Lin et al. | |
| 2013/0272892 A1 | 10/2013 | Liu | |
| 2013/0280085 A1 | 10/2013 | Koegler | |
| 2014/0072441 A1 * | 3/2014 | Asheim | F03D 1/0608 416/241 R |
| 2014/0093380 A1 | 4/2014 | Drobietz et al. | |
| 2014/0294592 A1 | 10/2014 | Drack et al. | |
| 2014/0377077 A1 | 12/2014 | Gruber et al. | |
| 2015/0050154 A1 | 2/2015 | Dixon et al. | |
| 2015/0078896 A1 | 3/2015 | Oerlemans | |
| 2015/0078910 A1 | 3/2015 | Oerlemans | |
| 2015/0078913 A1 * | 3/2015 | Enevoldsen | F03D 1/0608 416/241 R |
| 2015/0210506 A1 | 7/2015 | Kattainen et al. | |
| 2015/0247487 A1 | 9/2015 | Oerlemans et al. | |
| 2015/0267678 A1 | 9/2015 | Obrecht et al. | |
| 2015/0300317 A1 * | 10/2015 | Altmikus | F03D 13/10 416/235 |
| 2015/0316025 A1 | 11/2015 | Enevoldsen et al. | |
| 2015/0316029 A1 | 11/2015 | Altmikus et al. | |

(56) References Cited

U.S. PATENT DOCUMENTS

| | | |
|---|---|---|
| 2015/0349688 A1 | 12/2015 | Wagoner et al. |
| 2016/0177919 A1 | 6/2016 | Van Garrel et al. |
| 2016/0177922 A1 | 6/2016 | Zamora Rodriguez et al. |
| 2016/0312763 A1 | 10/2016 | Arce et al. |
| 2017/0016426 A1* | 1/2017 | Kuhn ................... F03D 80/30 |
| 2017/0045031 A1 | 2/2017 | Asheim et al. |
| 2017/0107970 A1 | 4/2017 | Arce |
| 2017/0107971 A1 | 4/2017 | Singh |
| 2017/0122286 A1 | 5/2017 | Alexander et al. |
| 2017/0138340 A1 | 5/2017 | Asheim et al. |
| 2017/0145990 A1 | 5/2017 | Drack et al. |
| 2017/0204832 A1 | 7/2017 | Kamruzzaman et al. |
| 2018/0142671 A1 | 5/2018 | Asheim et al. |
| 2018/0216600 A1 | 8/2018 | Zamora Rodriguez |

FOREIGN PATENT DOCUMENTS

| | | |
|---|---|---|
| DE | 102006043462 A1 | 3/2008 |
| DE | 102005019905 B4 | 12/2012 |
| EP | 1607624 A2 | 12/2005 |
| EP | 2028366 A2 | 2/2009 |
| EP | 2053240 A1 | 4/2009 |
| EP | 2216545 A2 | 8/2010 |
| EP | 2270312 A1 | 1/2011 |
| EP | 2806156 A1 | 11/2014 |
| EP | 3096003 A1 | 11/2016 |
| EP | 2783103 B1 | 1/2017 |
| EP | 3147498 A1 | 3/2017 |
| EP | 3176425 A1 | 6/2017 |
| JP | 2000120524 A | 4/2000 |
| JP | 2003254225 A | 9/2003 |
| JP | 2008115783 A | 5/2008 |
| WO | WO 98/21091 A1 | 5/1998 |
| WO | WO2008/035149 A2 | 3/2008 |
| WO | WO2008/113349 A2 | 9/2008 |
| WO | WO2009/025549 A1 | 2/2009 |
| WO | WO2013/045601 A1 | 4/2013 |
| WO | WO2014/048437 A1 | 4/2014 |
| WO | WO2014/048581 A1 | 4/2014 |
| WO | WO2015/074661 A1 | 5/2015 |
| WO | WO 2017/088880 A1 | 6/2017 |
| WO | WO2017/103192 A1 | 6/2017 |
| WO | WO2017/137394 A1 | 8/2017 |

OTHER PUBLICATIONS

Risoe National Laboratory for Sustainable Energy, Controllable Rubber Trailing Edge Flap May Ease Stress on Wind Turbine Blades, Feb. 17, 2010, 3 Pages. https://www.renewableenergyworld.com/articles/2010/02/controllable-rubber-trailing-edge-flap-may-ease-stress-on-wind-turbine-blades.html.

Risoe National Laboratory for Sustainable Energy, Successful Wind Tunnel Test of Controllable Rubber Trailing Edge Flap for Wind Turbine Blades, Science Daily, Feb. 19, 2010, 2 Pages. http://www.sciencedaily.com/releases/2010/02/100217093654.htm.

Risoe National Laboratory for Sustainable Energy, The Technical University of Denmark, Flexible Trailing Edge Flap for Blades to Make Wind Power Cheaper, Science Daily, Apr. 7, 2011, 2 Pages. https://www.eurekalert.org/pub_releases/2011-04/mlf-fte040711.php.

Oerlemans et al., Reduction of wind turbine noise using optimized airfoils and trailing-edge serrations, National Aerospace Laboratory NLR, vol. 47, Issue 6, p. 5 of 16 Pages, Jun. 2009.

Barone, Survey of Techniques for Reduction of Wind Turbine Blade Trailing Edge Noise, Sandia National Laboratories Albuquerque, New Mexico 87185 and Livermore, California 94550, p. 3 of 30 Pages.

Yang, Research status on aero-acoustic noise from wind turbine blades, 6th International Conference on Pumps and Fans with Compressors and Wind Turbines, vol. 52, Issue 1, p. 7 of 10 Pages, 2013.

International Search Report, dated Nov. 18, 2019.

* cited by examiner

NOISE REDUCER FOR A WIND TURBINE ROTOR BLADE HAVING A CAMBERED SERRATION

FIELD

The present disclosure relates generally to wind turbine rotor blades, and, more particularly, to noise reducers for wind turbine rotor blades having one or more cambered serrations.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

As the size of rotor blades increase, the noise produced by the rotor blades may also increase. As such, in certain instances, various blade add-on components may be attached to the rotor blades to assist with reducing noise generated thereby. More specifically, certain blade add-on components may be attached adjacent to the trailing edges of the rotor blades. Such blade add-on components may, for example, include serrations attached to the trailing edges of the rotor blades. Traditional serrations, however, can suffer from a high-frequency noise increase due to the side edge vortices created by the pressure imbalance on both sides of the serration.

Accordingly, the present disclosure is directed to noise reducers that eliminate the noise-generating side edges of conventional serrations to address the aforementioned issues. In addition, the noise reducers of the present disclosure are configured to modify the scattering of pressure fluctuations into sound waves.

BRIEF DESCRIPTION

Aspects and advantages of the invention will be set forth in part in the following description, or may be obvious from the description, or may be learned through practice of the invention.

In one aspect, the present disclosure is directed to a rotor blade assembly for a wind turbine. The rotor blade assembly includes a rotor blade having surfaces defining a pressure side, a suction side, a leading edge, and a trailing edge extending between a blade tip and a blade root. The rotor blade assembly also includes at least one noise reducer adjacent to the trailing edge. The noise reducer(s) includes at least one serration extending beyond the trailing edge in a chord-wise direction of the rotor blade. The serration(s) also includes a suction side surface and a pressure side surface that together define a panto cross-sectional shape along at least a portion of a lateral direction of the serration(s). Further, the suction side surface defines a first radius of curvature in the chord-wise direction and the pressure side surface defines a second radius of curvature in the chord-wise direction.

In one embodiment, the noise reducer(s) may also include a base portion secured and adjacent to at least one of the pressure side or the suction side of the rotor blade. Further, in such embodiments, the serration(s) extends from the base portion. In another embodiment, the cross-sectional shape of the serration(s) may vary in the lateral direction of the serration(s).

In several embodiments, the serration(s) may have a suction side surface and a pressure side surface. In such embodiments, the suction side surface defines a first radius of curvature and the pressure side surface defines a second radius of curvature. Further, in one embodiment, the first radius of curvature and the second radius of curvature may be different. For example, in certain embodiments, the first radius of curvature may be larger than the second radius of curvature such that the suction side surface is flatter than the pressure side surface. Alternatively, the first radius of curvature and the second radius of curvature are equal.

In further embodiments, the first radius of curvature of the suction side surface and/or the second radius of curvature of the pressure side surface may vary along at least a portion of a longitudinal direction of the serration(s). For example, the first radius of curvature of the suction side surface of the serration(s) may increase along at least a portion of the longitudinal direction of the serration(s) from a first end at the base portion to an opposing, second end. Similarly, the second radius of curvature of the pressure side surface of the serration(s) may increase along at least a portion of the longitudinal direction of the serration(s) from a first end at the base portion to an opposing, second end.

In additional embodiments, a flap angle of the serration(s) may vary from about −30 degrees (°) to +30° with respect to a chord of the rotor blade. The negative angle indicates that the serration bends towards pressure side of the rotor blade. In another embodiment, the serration(s) may also have a tip end that defines a distal-most tip. More specifically, in such embodiments, the tip end may have a conical shape.

In several embodiments, the base portion of the noise reducer(s) may be adjacent to the pressure side of the rotor blade. In another embodiment, a cross-sectional shape of the base portion may be tapered.

In particular embodiments, at least a portion of the serration(s) may be hollow.

In another aspect, the present disclosure is directed to a rotor blade assembly for a wind turbine. The rotor blade assembly includes a rotor blade having surfaces defining a pressure side, a suction side, a leading edge, and a trailing edge extending between a blade tip and a blade root. The rotor blade assembly also includes at least one noise reducer adjacent to the trailing edge. The noise reducer(s) includes a base portion and at least one serration extending from the base portion and beyond the trailing edge in a chord-wise direction of the rotor blade. The serration(s) includes a suction side surface and a pressure side surface. The suction side surface defines a first radius of curvature in the chord-wise direction and the pressure side surface defines a second radius of curvature in the chord-wise direction. Further, the first radius of curvature is larger than the second radius of curvature such that the suction side surface is flatter than the pressure side surface. It should be further understood that the rotor blade assembly may further include any of the additional features as described herein.

In yet another aspect, the present disclosure is directed to a noise reducer for a rotor blade of a wind turbine. The noise reducer includes a base portion adjacent to at least one of the pressure side or the suction side of the rotor blade and at least one serration extending from the base portion. The serration(s) extend beyond the trailing edge in a chord-wise direction of the rotor blade. The serration(s) also includes a suction side surface and a pressure side surface that together define an airfoil cross-sectional shape in a longitudinal direction of the serration(s). In addition, the airfoil cross-sectional shape of the serration(s) varies in a lateral direction of the at least one serration. It should be further understood that the noise reducer may further include any of the additional features as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
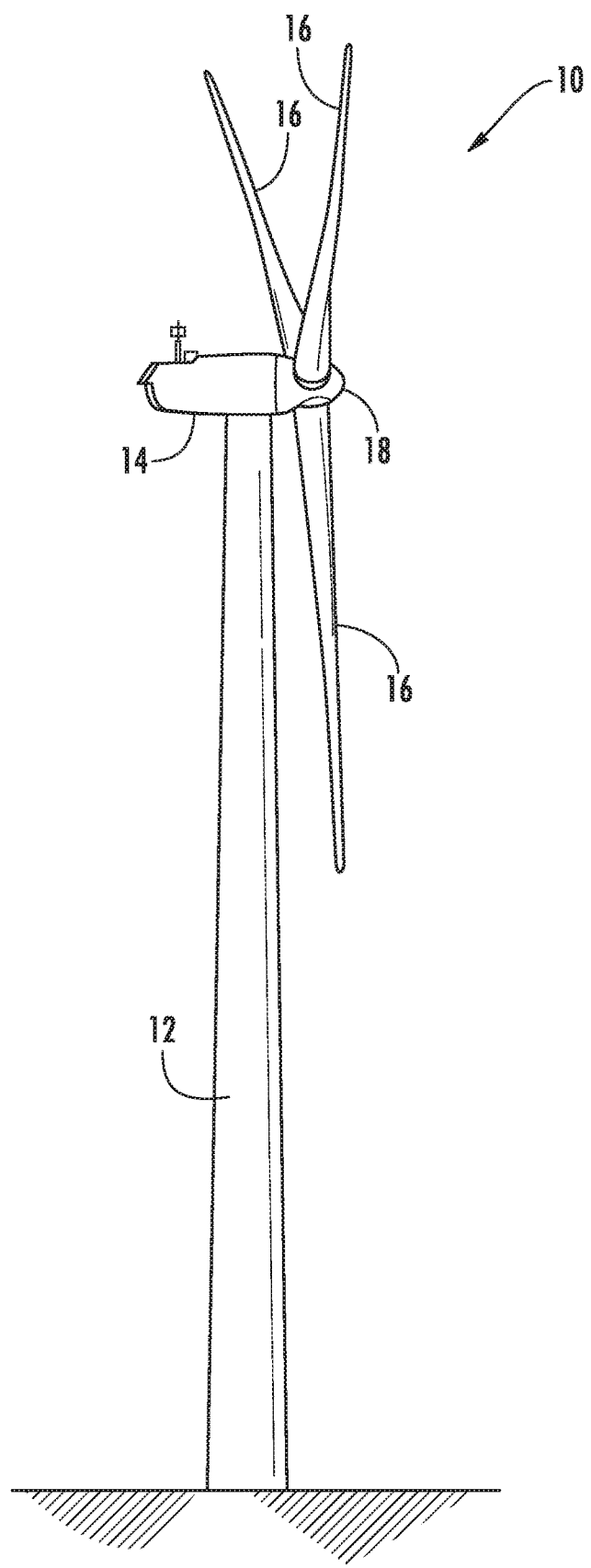
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to an airfoil-shaped component for a wind turbine rotor blade trailing edge designed to suppress aerodynamic noise emitted by the trailing edge. More particularly, the noise reducer has a serration shape with a three-dimensional cambered streamline body design. As such, the noise reducer of the present disclosure eliminates most of the sharp edges associated with conventional serration geometry, which are ultimately responsible for the far field noise generation. Accordingly, the noise reducer of the present disclosure achieves higher noise reduction by reducing scattering of the incoming and self-generated turbulent fluctuations. In addition, the cambered shape beneficially manipulates the flow field around and upstream of the serrations to achieve the best low frequency noise reduction.

Referring now to the drawings, FIG. 1 illustrates a perspective view of one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
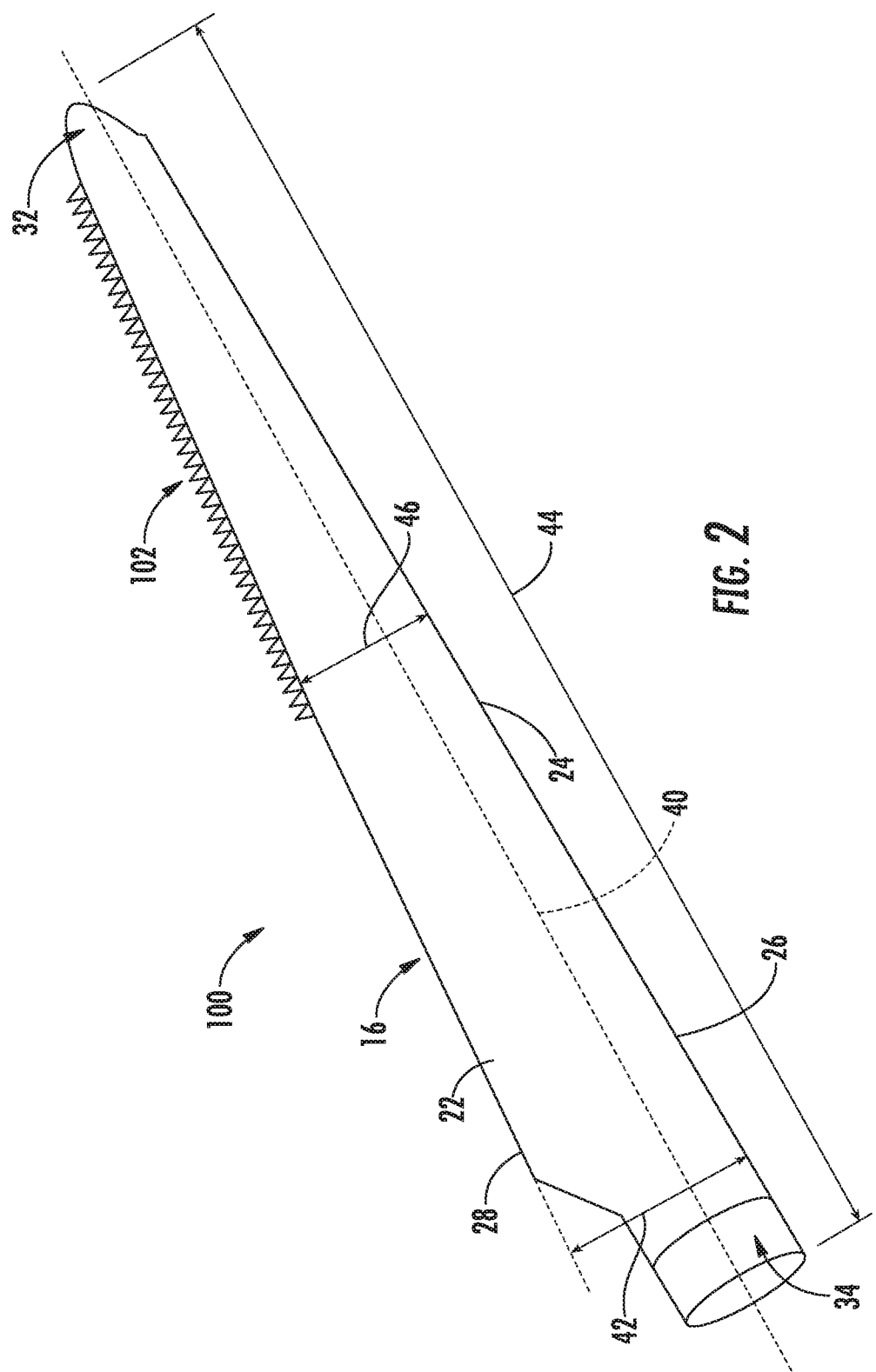
FIG. 2 illustrates a perspective view a rotor blade assembly according to the present disclosure, particularly illustrating a plurality of noise reducers adjacent to at the trailing edge of the rotor blade.
Figure 3:
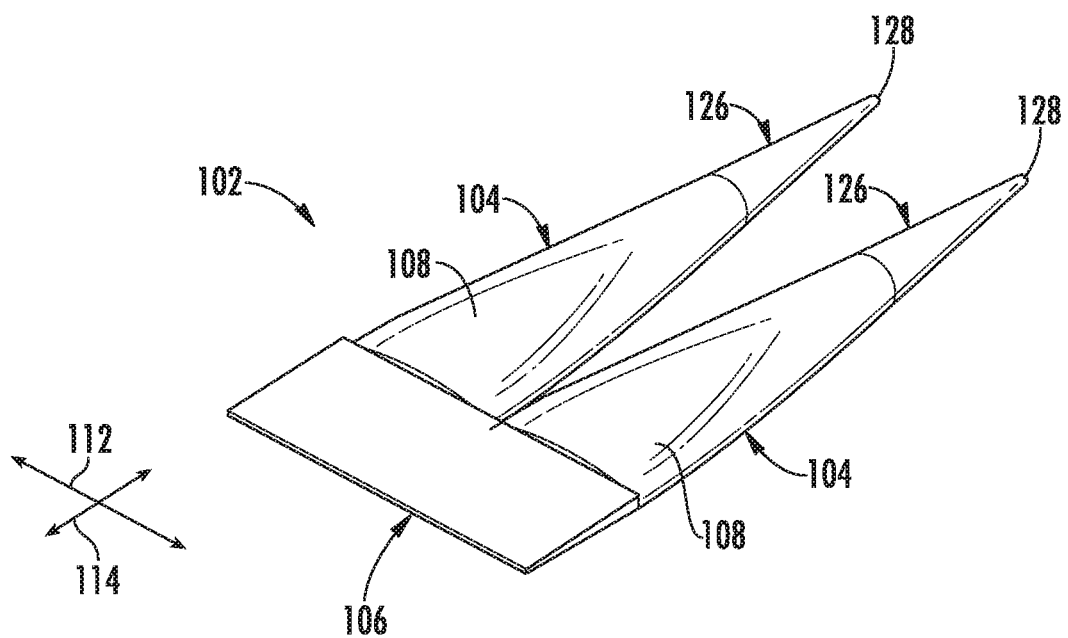
FIG. 3 illustrates a perspective view of one embodiment of a noise reducer according to the present disclosure, particularly illustrating the noise reducer viewed from the suction side surface thereof.

Referring now to FIG. 2, a perspective view of a rotor blade assembly 100 including one of the rotor blades 16 of FIG. 1 is illustrated. As shown, the rotor blade assembly 100 includes the rotor blade 16. Further, the rotor blade 16 generally includes surfaces defining a pressure side 22 and a suction side 24 extending between a leading edge 26 and a trailing edge 28, and may extend from a blade tip 32 to a blade root 34. In one embodiment, the rotor blade 16 may include a plurality of individual blade segments aligned in an end-to-end order from the blade tip 32 to the blade root 34. As such, each of the individual blade segments may be uniquely configured so that the plurality of blade segments defines a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

In addition, the rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

Still referring to FIG. 2, the rotor blade 16 may further define a pitch axis 40. The pitch axis 40 may generally be defined with respect to the rotor hub 18 of the wind turbine 10. For example, the pitch axis 40 may extend generally perpendicularly to the rotor hub 18 and the blade root 34 through the center of the blade root 34. A pitch angle or blade pitch of the rotor blade 16, i.e., an angle that determines a perspective of the rotor blade 16 with respect to the airflow past the wind turbine 10, may be defined by rotation of the rotor blade 16 about the pitch axis 40. The rotor blade 16 may further define a chord 42 and a span 44. As shown in FIG. 2, the chord 42 may vary throughout the span 44 of the rotor blade 16. Thus, a local chord 46 may be defined for the rotor blade 16 at any point on the rotor blade 16 along the span 44.

In addition, as shown, the rotor blade assembly 100 includes at least one noise reducer 102, e.g. adjacent to or near the trailing edge 28 of the rotor blade 16. Alternatively, the noise reducer 102 may be adjacent to the leading edge 26 of the rotor blade 16, adjacent to the blade tip 32, and/or adjacent to the blade root 34 of the rotor blade 16. Further, the noise reducer(s) 102 may be secured to or mounted to the rotor blade 16 or may be integral with the rotor blade 16. Thus, it should be understood that the noise reducer(s) 102 may be adjacent to any suitable location along any of the surfaces of the rotor blade 16. As such, the noise reducer 102 is configured to reduce noise generated by the rotor blades 16 during operation of the wind turbine 10 and/or may increase the efficiency of the rotor blades 16. The noise reducer(s) 102 may be secured to the rotor blade 16 using any suitable means, such as by adhesives, tape, welding, and/or mechanical fasteners (e.g., bolts, screws, and rivets) and/or by clipping the noise reducer(s) 102 into suitable recesses or onto protrusions.

Further, as shown, the noise reducer(s) 102 may extend along a portion of the trailing edge 28 of the rotor blade 16. For example, the noise reducer(s) 102 may extend along a portion of the trailing edge 28 near the blade tip 32, as shown in FIG. 2. In other embodiments, the noise reducer(s) 102 may extend along a portion of the trailing edge 28 near the blade root 34. Still, in other embodiments, the noise reducer(s) 102 may extend along a portion of the rotor blade 16 in between the blade tip 32 and the blade root 34. It should also be recognized that the noise reducer(s) 102 may extend along the entirety of the trailing edge 28.

Figure 12:
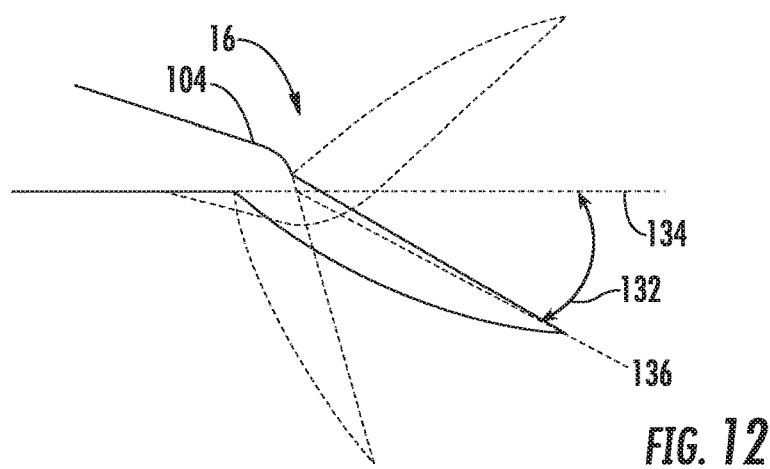
FIG. 12 illustrates a side view of one embodiment of a noise reducer according to the present disclosure, particularly illustrating various flap angles of the serration(s) of the noise reducer.
Figure 13:
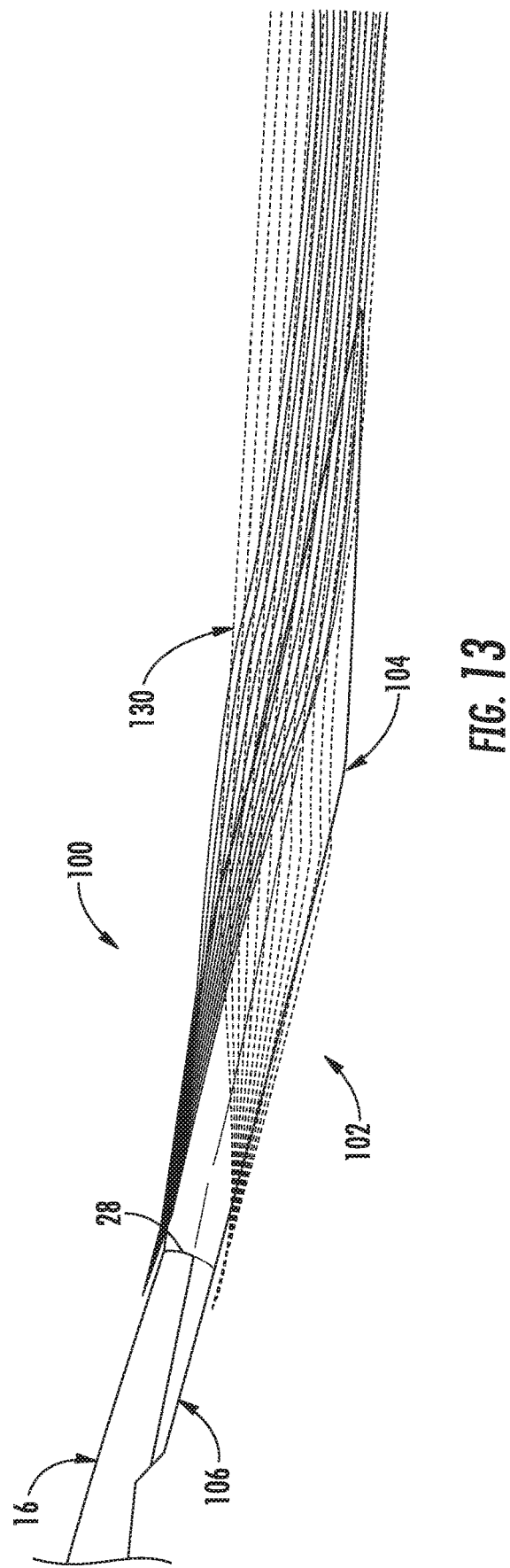
FIG. 13 illustrates a side view of one embodiment of a noise reducer according to the present disclosure, particularly illustrating the streamlines of airflow passing over the noise reducer.

Referring now to FIGS. 3-13, multiple views of various embodiments of the noise reducers 102 according to the present disclosure are illustrated. More particularly, as shown, the noise reducers 102 of the present disclosure each include a base portion 106 and at least one serration 104 extending from the base portion 106 and beyond the trailing edge 28 in a chord-wise direction (i.e. a direction along the chord 42 of the rotor blade 16). For example, FIGS. 3-9 illustrate perspective views of various embodiments of the noise reducer 102 having a plurality of serrations 104 extending from the base portion 106 according to the present disclosure. FIG. 13 illustrates a side view of one embodiment of the noise reducer 102 having a single serration 104 extending from the base portion 106 according to the present disclosure. It should be understood that each noise reducer 102 may include any number of serrations 104.

In addition, the base portion 106 described herein may be adjacent to the trailing edge 28 of the rotor blade 16. In such embodiments, the serration(s) 104 may extend from the base portion 106 and past or beyond the trailing edge 28. In addition, in several embodiments, the base portion 106 of the noise reducer(s) 102 may be adjacent to the pressure side 22 of the rotor blade 16. Alternatively, the base portion 106 may be adjacent to the suction side 24 of the rotor blade 16. In another embodiment, a cross-sectional shape of the base portion 106 may be tapered or contoured so as to correspond to the curvature of the rotor blade surface it is attached to.

In addition, the serration(s) 104 may be integral with base portion 106 and/or may be separately coupled to the base portion 106. In alternative embodiments, the noise reducers 102 may be absent of a base portion 106. In such embodiments, the serration(s) 104 may be mounted directly to the rotor blade 16. As such, the base portion 106 and/or the serration(s) 12 of the noise reducer(s) 102 may be secured to the rotor blade 16 using any suitable means, such as by adhesives, tape, welding, and/or mechanical fasteners (e.g., bolts, screws, and rivets) and/or by clipping the noise reducer(s) 102 into suitable recesses or onto protrusions.

Referring particularly to FIGS. 3-13, each of the serration(s) 104 includes a suction side surface 108 and a pressure side surface 110 that together define a cambered cross-sectional shape in both longitudinal and lateral directions 112, 114 of the serration(s) 104. In one embodiment, as shown in FIGS. 9-12, the cambered cross-sectional shape of the serration(s) 104 may define an airfoil in the longitudinal direction 114. In such embodiments, as shown particularly in FIGS. 10 and 11, the airfoil cross-sectional shape of the serration(s) 104 may vary in the lateral direction 112 of the serration(s) 104 (as indicated by the changing airfoil shapes 120). In addition, as shown particularly in the illustrated embodiment of FIG. 8, the suction side surface 108 may define a first radius of curvature 116 in the chord-wise direction and the pressure side surface 110 defines a second radius of curvature 118 in the chord-wise direction. Thus, as shown, the first radius of curvature 108 may be larger than the second radius of curvature 118 such that the suction side surface 108 is flatter than the pressure side surface 110 or vice versa.

Figure 4:
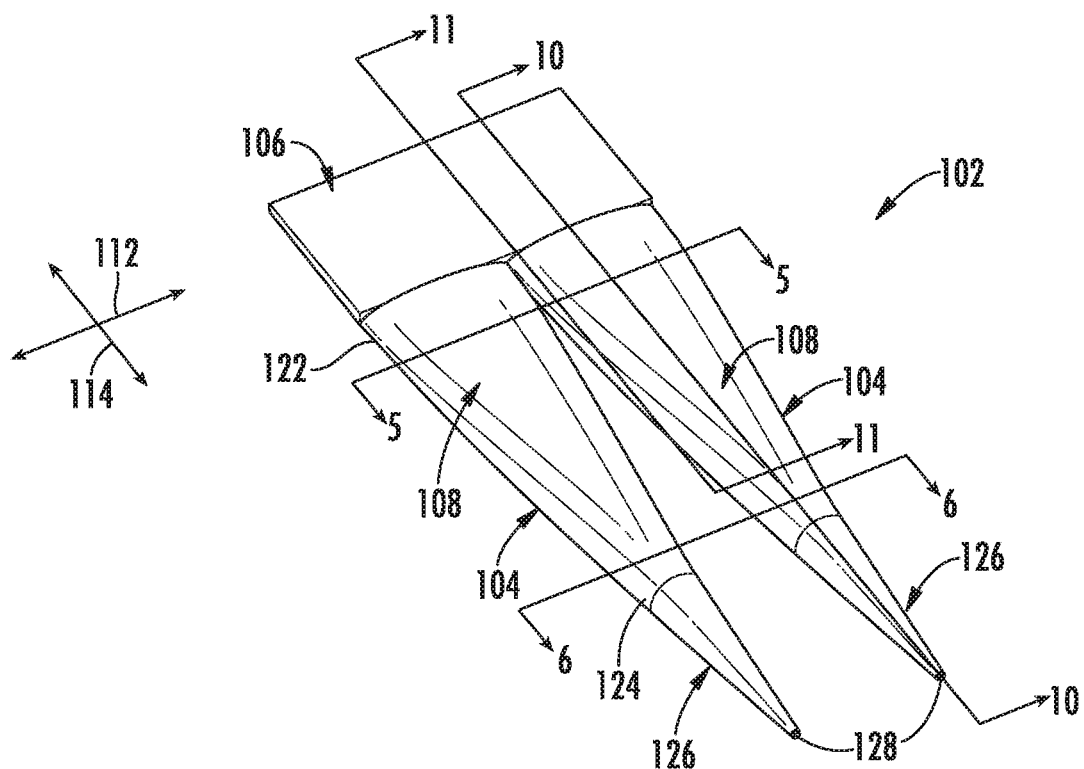
FIG. 4 illustrates another perspective view of one embodiment of a noise reducer according to the present disclosure, particularly illustrating the noise reducer viewed from the suction side surface thereof as well as cross-sectional views along section lines 5-5 and 6-6.
Figure 5:
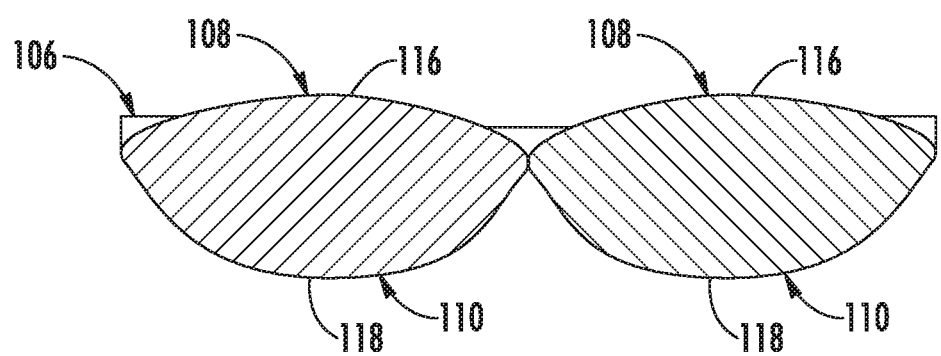
FIG. 5 illustrates a cross-sectional view of the noise reducer of FIG. 4 along section line 5-5.
Figure 6:
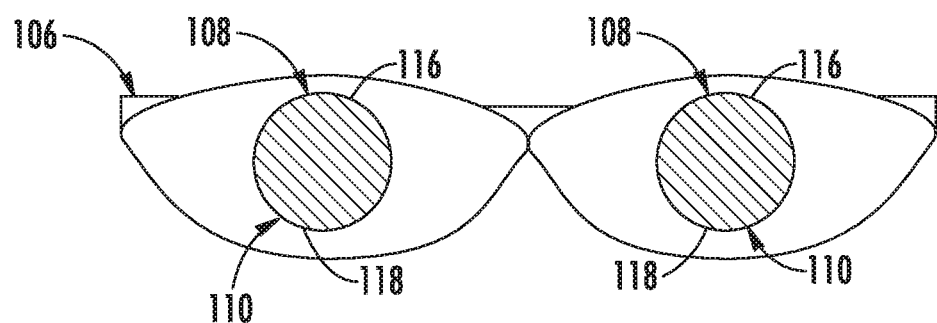
FIG. 6 illustrates a cross-sectional view of the noise reducer of FIG. 4 along section line 6-6.
Figure 7:
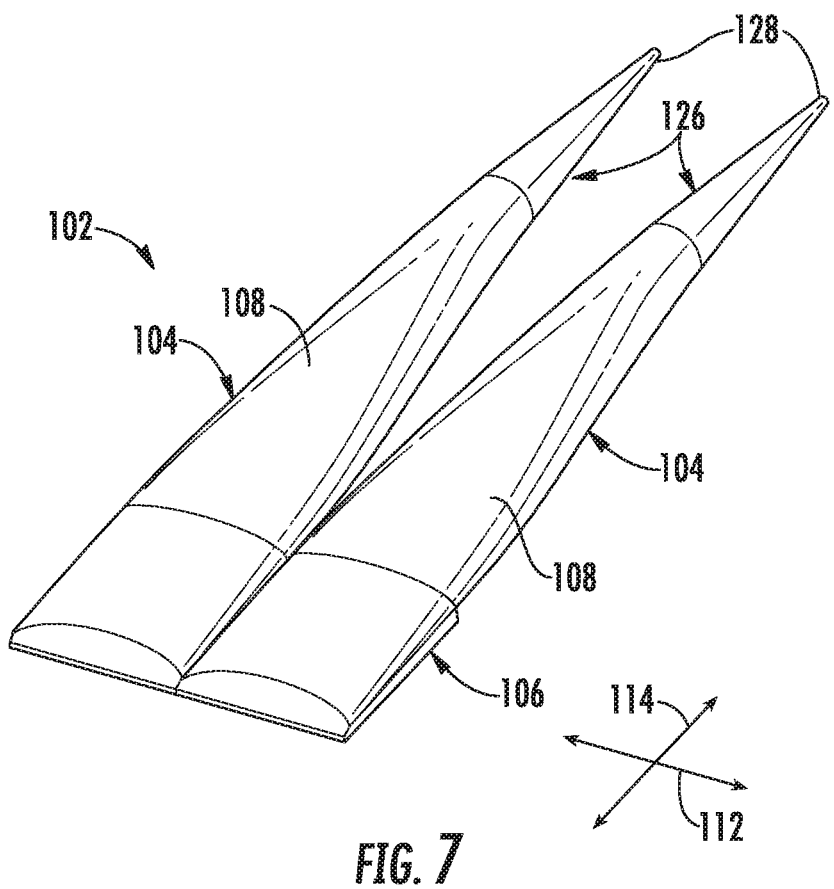
FIG. 7 illustrates a perspective view of one embodiment of a noise reducer according to the present disclosure, particularly illustrating the noise reducer viewed from the pressure side surface thereof.
Figure 8:
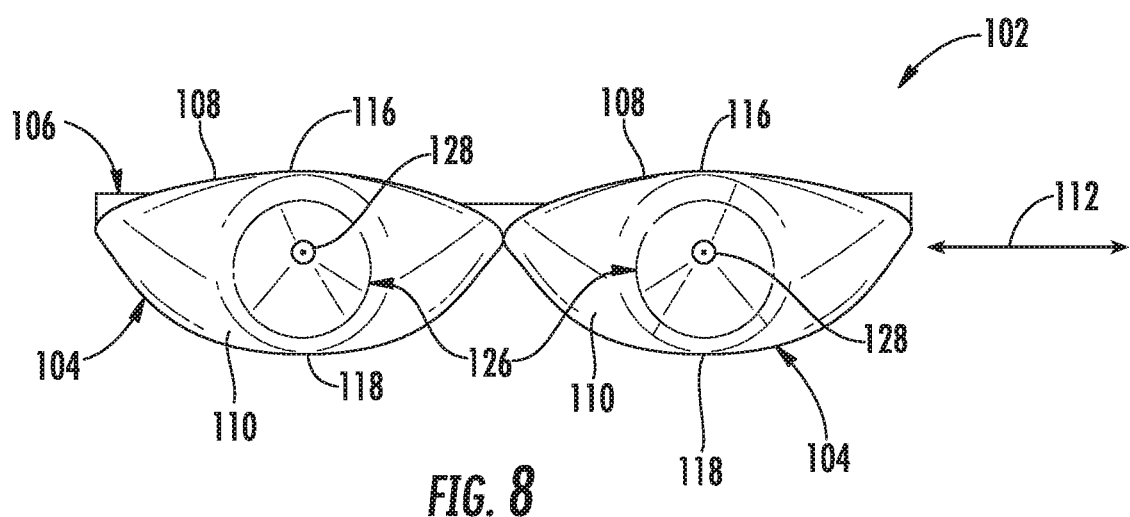
FIG. 8 illustrates a front view of one embodiment of a noise reducer according to the present disclosure.

In further embodiments, as shown particularly in FIGS. 4-6, the first radius of curvature 116 of the suction side surface 108 and/or the second radius of curvature 118 of the pressure side surface 110 may vary along at least a portion of the longitudinal direction 114 of the serration(s) 104. For example, as shown by section lines 5-5 and 6-6, the first radius of curvature 116 of the suction side surface 108 of the serration(s) 104 may increase along at least a portion of the longitudinal direction 114 of the serration(s) 104 from a first end 122 at the base portion 106 to an opposing, second end 124. Similarly, the second radius of curvature 118 of the pressure side surface 110 of the serration(s) 104 may increase along at least a portion of the longitudinal direction 114 of the serration(s) 104 from the first end 122 at the base portion 106 to the second end 124.

In addition, as shown in FIGS. 5 and 6, the cambered cross-sectional shape may define a generally panto cross-sectional shape in the lateral direction 112. As used herein, a panto cross-sectional shape generally describes a hybrid shape combining aspects of a circle and an oval. Thus, a panto shape is generally wider on one side, thereby having one side that is flatter than the other.

Figure 9:
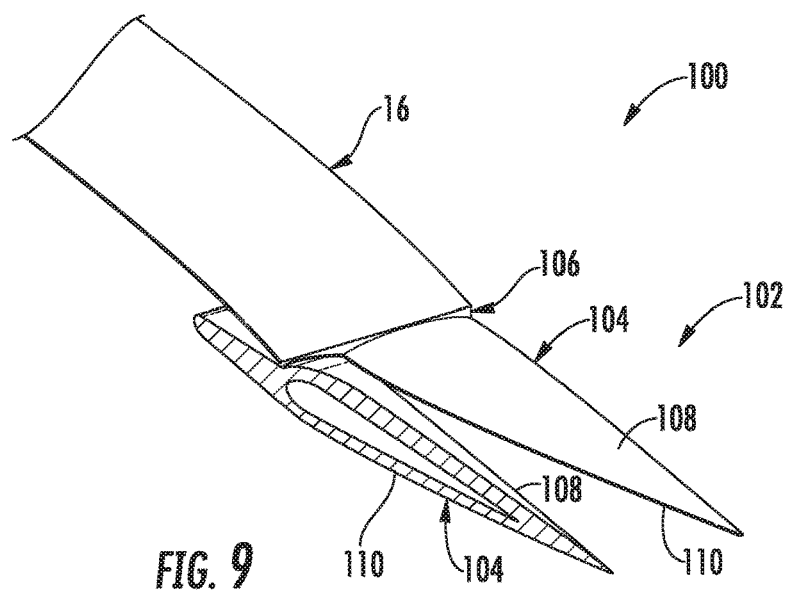
FIG. 9 illustrates a perspective view of one embodiment of a noise reducer adjacent to a trailing edge of a rotor blade according to the present disclosure.
Figure 10:
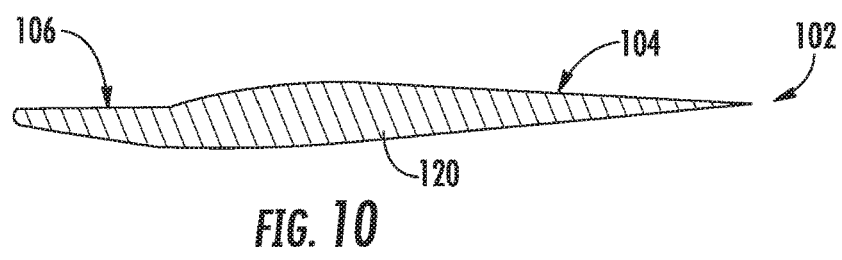
FIG. 10 illustrates a cross-sectional view of the noise reducer of FIG. 4 along section line 10-10.
Figure 11:
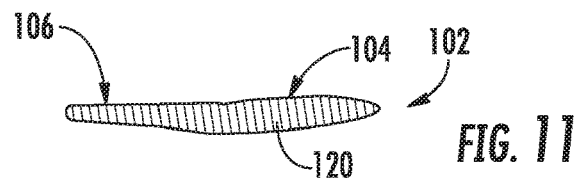
FIG. 11 illustrates a cross-sectional view of the noise reducer of FIG. 4 along section line 11-11.

Referring specifically to FIGS. 3-8, the serration(s) 104 may also have a tip end 126 that defines a distal-most tip 128. More specifically, in such embodiments, the tip end 126 may have a conical shape. The tip end 126 may be integral with the remaining portions of the serration(s) 104 or may be attached as a separate piece. In addition, as shown in FIG. 9, at least a portion of the serration(s) 104 may be hollow so as to reduce weight of the serration(s) 104. In alternative embodiments, the serration(s) may have a solid cross-section.

In additional embodiments, a flap angle 132 of the serration(s) 104 may vary from about −30 degrees (°) to +30° with respect to the chord 42 of the rotor blade 16. For example, as shown in FIG. 12, the serration(s) 104 may be mounted to the pressure and/or suction sides 22, 24 of the rotor blade 16 at any suitable angle between about −30(°) to about +30°. As described herein, the flap angle 132 of the serration(s) 104 generally refer to the angle between the chord line 134 and the line 136 from the pressure side trailing edge to the tip of the serration(s) 104.

Referring now to FIG. 13, a side view of the rotor blade assembly 100 at the trailing edge 28 of the rotor blade 16 with the noise reducer 102 adjacent thereto is illustrated. More specifically, as shown, the streamlines 130 at the trailing edge 28 are illustrated. Thus, as shown, the camber/curvature features of the noise reducer(s) 102 of the present disclosure create a pressure difference between the suction and pressure side surfaces 108, 110 and guide the streamlines 130 in a manner to further reduce low-frequency noise. Such reduction in noise occurs because portions of the serration(s) body extend into the approaching boundary layer. In addition, longitudinal vortices form on the streamlined serration teeth bodies, thereby influencing the upstream flow.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
   a rotor blade having surfaces defining a pressure side, a suction side, a leading edge, and a trailing edge extending between a blade tip and a blade root; and,
   at least one noise reducer adjacent to the trailing edge, the at least one noise reducer comprising at least one serration extending beyond the trailing edge in a chord-wise direction of the rotor blade, the at least one serration comprising a first span-wise surface and a second span-wise surface that together define a panto cross-sectional shape along at least a portion of a lateral direction of the at least one serration, the first span-wise surface defining a first radius of curvature in the chord-wise direction, the second span-wise surface defining a second radius of curvature in the chord-wise direction, wherein the first radius of curvature of the first span-wise surface of the at least one serration and the second radius of curvature of the second span-wise surface of the at least one serration are different.

2. The rotor blade assembly of claim 1, wherein the at least one noise reducer further comprises a base portion secured and adjacent to at least one of the pressure side or the suction side of the rotor blade, the at least one serration extending from the base portion.

3. The rotor blade assembly of claim 1, wherein the first radius of curvature is larger than the second radius of curvature such that the first span-wise surface is flatter than the second span-wise surface.

4. The rotor blade assembly of claim 1, wherein at least one of the first radius of curvature of the first span-wise surface or the second radius of curvature of the second span-wise surface varies along at least a portion of a longitudinal direction of the at least one serration.

5. The rotor blade assembly of claim 4, wherein the first radius of curvature of the first span-wise surface of the at least one serration increases along at least a portion of the longitudinal direction of the at least one serration from a first end to an opposing, second end.

6. The rotor blade assembly of claim 4, wherein the second radius of curvature of the second span-wise surface of the at least one serration increases along at least a portion of the longitudinal direction of the at least one serration from a first end to an opposing, second end.

7. The rotor blade assembly of claim 1, wherein a flap angle of the at least one serration varies from about −30 degrees (°) to +30° with respect to a chord of the rotor blade.

8. The rotor blade assembly of claim 1, wherein the at least one serration comprises a tip end defining a distal-most tip, the tip end comprising a conical shape.

9. The rotor blade assembly of claim 2, wherein the base portion is adjacent to the pressure side of the rotor blade.

10. The rotor blade assembly of claim 1, wherein at least a portion of the at least one serration is hollow.

11. The rotor blade assembly of claim 2, wherein a cross-sectional shape of the base portion is tapered.

12. A rotor blade assembly for a wind turbine, the rotor blade assembly comprising:
   a rotor blade having surfaces defining a pressure side, a suction side, a leading edge, and a trailing edge extending between a blade tip and a blade root; and,
   at least one noise reducer adjacent to the trailing edge, the at least one noise reducer comprising a base portion adjacent to at least one of the pressure side or the suction side of the rotor blade and at least one serration extending from the base portion, the at least one serration extending beyond the trailing edge in a chord-wise direction of the rotor blade, the at least one serration comprising a first span-wise surface and a second span-wise surface, the first span-wise surface defining a first radius of curvature, the second span-wise surface defining a second radius of curvature, the first radius of curvature being larger than the second radius of curvature such that the first span-wise surface is flatter than the second span-wise surface,
   wherein the first radius of curvature of the first span-wise surface of the at least one serration increases along at least a portion of the longitudinal direction of the at least one serration from a first end at the base portion to an opposing, second end.

13. The rotor blade assembly of claim 12, wherein the at least one serration defines an airfoil cross-sectional shape in a longitudinal direction of the at least one serration.

14. The rotor blade assembly of claim 13, wherein the airfoil cross-sectional shape of the at least one serration varies in a lateral direction of the at least one serration.

15. The rotor blade assembly of claim 12, wherein the second radius of curvature of the second span-wise surface of the at least one serration increases in the longitudinal direction of the at least one serration from a first end at the base portion to an opposing, second end.

16. The rotor blade assembly of claim 12, wherein a cross-sectional shape of the base portion is tapered.

* * * * *